Inventor
ALFRED MOORHOUSE.
By
Attorney

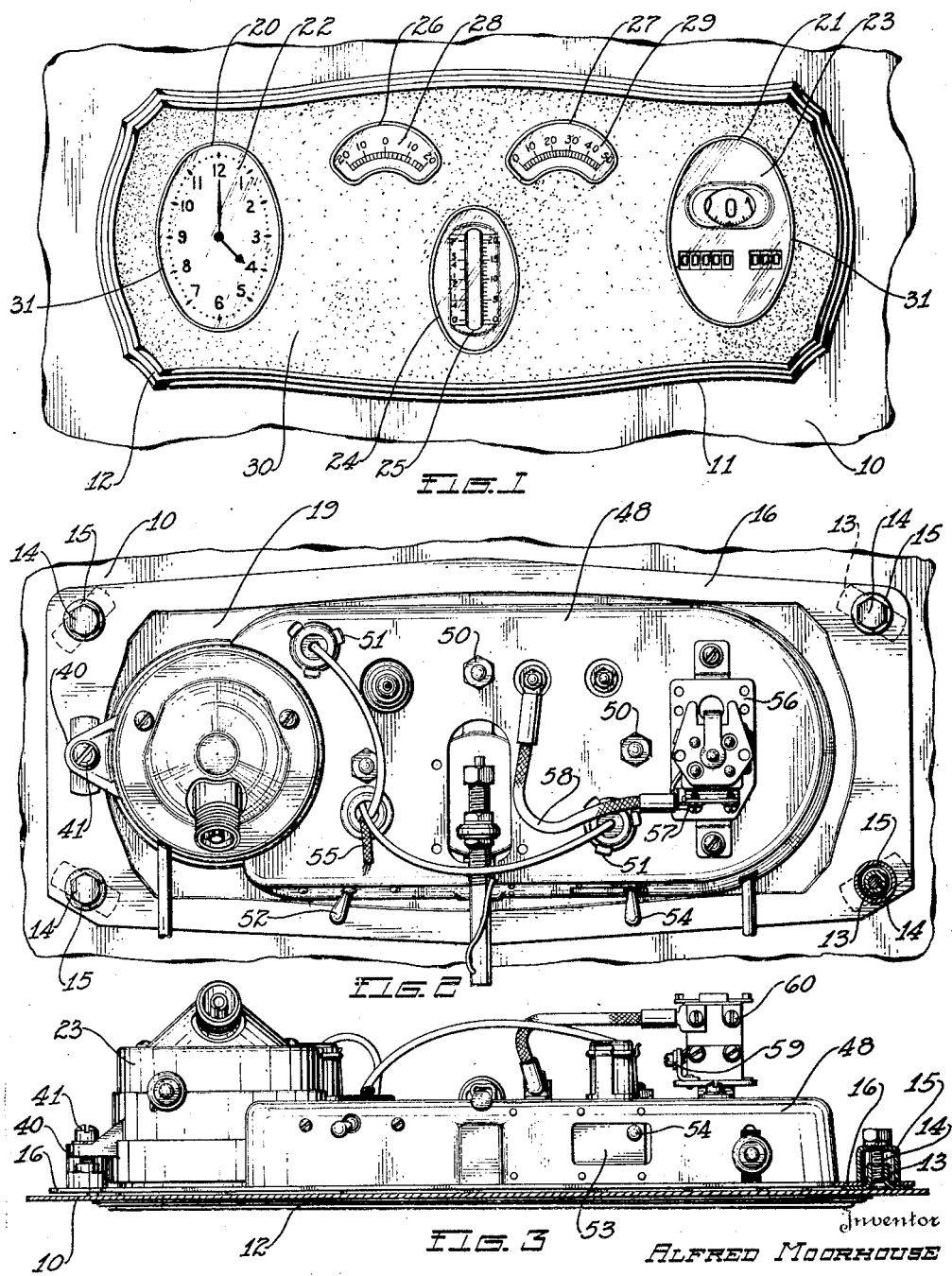
Sept. 10, 1929.     A. MOORHOUSE     1,728,000
INSTRUMENT BOARD
Filed Aug. 10, 1927     2 Sheets-Sheet 1
Inventor
ALFRED MOORHOUSE Sept. 10, 1929.  A. MOORHOUSE  1,728,000
INSTRUMENT BOARD
Filed Aug. 10, 1927  2 Sheets-Sheet 2

Patented Sept. 10, 1929.

1,728,000

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

INSTRUMENT BOARD.

Application filed August 10, 1927. Serial No. 211,870.

This invention relates to motor vehicles and more particularly to an instrument board therefor.

An object of the invention is to provide a unitary mounting for a plurality of indicating instruments for use in the operation of a motor vehicle.

Another object of the invention is to provide a mounting for indicating instruments having the instruments arranged or assembled on a demountable panel, adaptable for adjustment to the instrument board of a motor vehicle as an independent unit.

Another object of the invention is to provide a group of indicating instruments assembled as a single unit which may be easily and quickly mounted upon an instrument board of a motor vehicle, and to provide means whereby one of the instruments can be dismounted without disturbing the other instruments in the group and their housing.

Yet a further object of the invention is to provide a group of indicating instruments assembled as a single unit, arranged, constructed, and housed so that light can be projected upon the dials of the instruments.

Still a further object of the invention is to provide a panel having mounted thereupon a plurality of indicating instruments arranged and housed so that the panel with its associated instruments is adaptable for mounting upon an instrument board of a motor vehicle as a single unit and when so mounted with the individual instruments properly connected, will prove highly efficient in operation and yet of marked simplicity, so that its manufacture and assembly is economically facilitated.

In order to make the invention more clearly understood, I have shown in the accompanying drawings means for carrying the same into practical effect without limiting the improvements in their useful application to the particular construction, which for the purpose of this explanation have been made the subject of illustration.

In the drawings forming a part of this specification:

Fig. 1 is a front elevation of an instrument board partly broken away, illustrating a panel set therein with a plurality of indicating instruments arranged upon the panel;

Fig. 2 is a rear elevation;

Fig. 3 is a bottom plan view;

Figure 4:
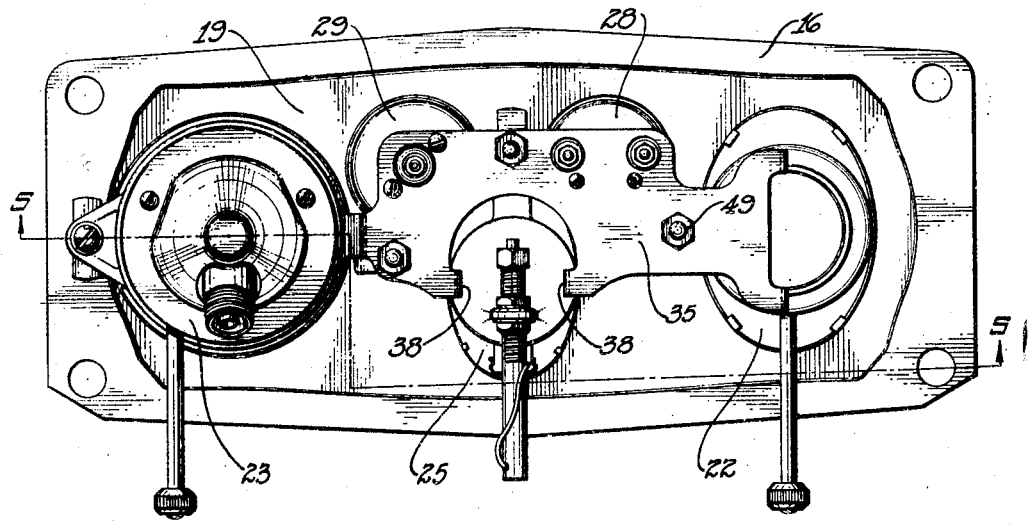
Fig. 4 is a rear elevation with the housing removed.
Figure 5:
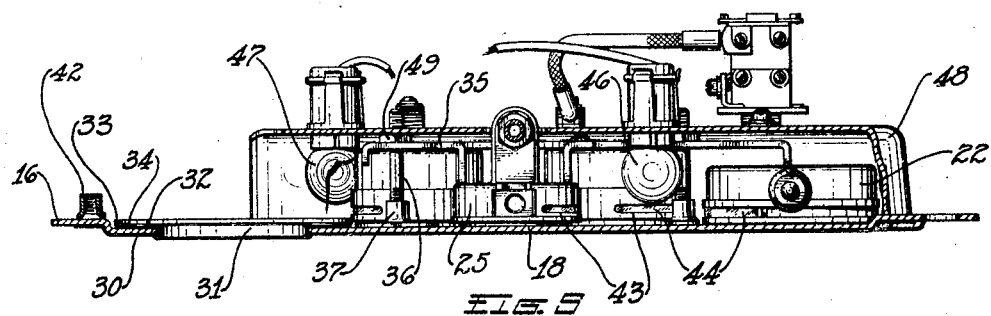
Fig. 5 is a sectional view taken substantially on line 5—5 of Fig. 4 with the housing in place.
Figures 6, 7:
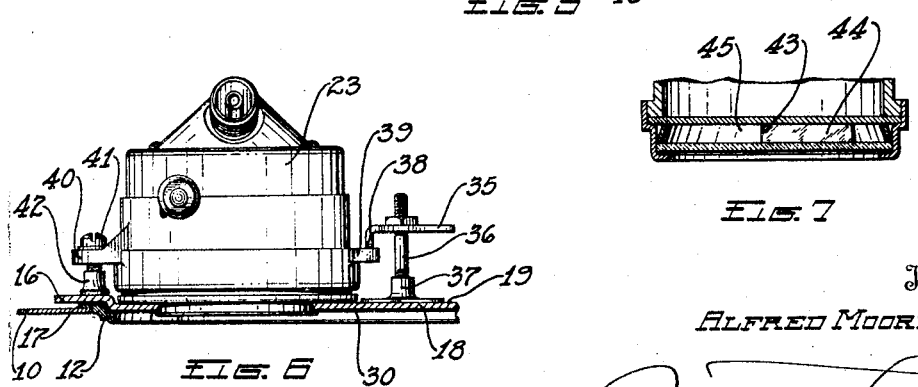
Fig. 6 is a fragmentary view illustrating the mounting of the speedometer.
Fig. 7 is an enlarged detail view, illustrating the dial of an indicating instrument with associated parts.

Referring by numerals to the drawings, 10 represents an instrument board of a motor vehicle, the instrument board having an opening 11, corresponding in configuration to that of the perimeter of a bezel 12, the object of which will hereinafter appear. The instrument board is provided with a plurality of bosses 13 spot-welded or otherwise secured upon the back of the board adjacent the opening. These bosses are tapped to receive stud bolts 14 and suitable washers 15 are mounted on the bolts for securing in position a panel 16.

As shown, the bezel 12 is formed with a flange 17 extending laterally from the base thereof, so that when the bezel 12 is fitted into the opening 11, the flange 17 lies flat upon the back of the instrument board and is clamped between the board and the panel 16. A neat and attractive finish for the perimeter of the instrument board immediately adjacent the bezel is attained by a snug fit of the bezel in the opening. The panel 16 has a raised portion or surface 18 formed by depressing the back of the panel as indicated at 19, the perimeter of the raised portion having the same contour as the groove in the back of the bezel to provide a neat joint between the bezel and the panel.

The raised portion 18 of the panel 16 has arranged adjacent its respective ends corresponding openings 20 and 21 providing suitable frames for a clock 22 and a speedometer 23. Centrally between and slightly below the openings 20 and 21 is a similar opening 24 of smaller size providing a suitable frame for a gasoline gage 25 and arranged above and to each side of the opening 24 are suitable openings 26 and 27 providing suitable frames for an ammeter 28 and an oil gage 29. As shown, the raised portion 18 of the panel 16 has a covering 30 of embossed leather or other suitable material glued or otherwise secured upon the panel and cut or stamped with openings corresponding to the openings 20, 21, 24, 26 and 27, the covering being further secured upon the raised portion of the panel by means of metal rims 31 mounted in the openings and crimped or turned to clamp the covering upon the panel. These rims give a neat and attractive finish to the edges of the panel around the openings. The rims also clamp or secure in position upon the back of the panel suitable supports 32 for the various indicating instruments heretofore mentioned. As shown, the supports each comprise a suitable plate having a peripheral flange 33 and rib members 34 adapted to position and to sustain an indicating instrument which is mounted with its face bearing upon the rib members 34 and its side wall engaging the peripheral flange 33.

The indicating instruments mounted upon the raised portion of the panel are clamped in position by means of a plate 35 mounted upon bolts or standards 36 threaded in tapped bosses 37 spot-welded or otherwise secured to the back of the panel. The plate 35 has a bearing upon the housing of the ammeter 28 and the housing of the oil gage 29 and is apertured to fit over the terminals of the ammeter and the connection of the oil gage. The plate is further provided with lugs 38 bent normal to the plate and adapted to engage the housing of the clock 22 and the housing of the gasoline gage 25. The speedometer is made demountable by means of oppositely disposed lugs 39 and 40, arranged upon the wall thereof, the lug 39 being adapted for engagement with one of the lugs 38 upon the plate 35 and the lug 40 being apertured to receive a stud bolt 41 threaded into a boss 42 secured to the back of the panel. By removing the stud bolt 41 the speedometer may be removed without disturbing the other instruments upon the board. This is a very desirable feature since it frequently becomes necessary to change speedometers in accordance with the make of instrument ordered and in substituting a speedometer indicating miles from one indicating kilometers.

Each of the instruments is provided with openings or circumferential slots 43 arranged in the wall thereof at any suitable position found most advantageous to admit light to the faces or dials of the respective instruments. As shown, the slots 43 are covered with transparent material 44 to exclude dust and surrounding the dials, with the exception of the spaces taken by the slots 43, are deflectors 45 to provide a more even distribution of the light. The slots 43 admit light to the faces of the dials projected from two lamps 46 and 47, positioned opposite the slots within a suitable housing 48.

The housing 48 encloses the clock, the ammeter, the gasoline gage and the oil gage and is arranged to fit snugly against the housing of the speedometer to permit the ready removal of the speedometer without interfering with the other instruments in the assembly and the housing therefor. As shown, the housing is apertured to receive the bolts or standards 36 and is clamped in position between nuts 49 and 50 threaded on the standards. The housing 48, together with the back of panel 18 and the wall of the speedometer, provides a complete enclosure for the clock, the ammeter, the gasoline gage, and the oil gage, and provides a screen around the light projected by the lamps 46 and 47. These lamps are mounted in suitable brackets 51 secured in the wall of the housing, the lamps being connected by suitable wiring to a snap switch 52 mounted in the wall of the housing adjacent the lower edge of the instrument board in order that the same will be readily accessible to an operator. The housing is further provided with a slide or shutter 53 operated by a handle 54 which is also readily accessible to the operator. The slide 53 is located in the wall of the housing immediately opposite the lamp 47 so that by opening or closing the slide or shutter, light may be projected into or excluded from the compartment of the vehicle in which the instrument board is located.

Leading from the snap switch 52 is a wire 55 adaptable for connection to a source of electrical supply and mounted upon the casing in any suitable position is a circuit breaker relay 56 having a terminal 57 connected by a suitable line 58 to one terminal of the ammeter, the other terminal of which is adaptable for connection to a starting switch, not shown. A terminal 59 of the circuit breaker relay is connected to the starting switch, not shown, and a terminal 60 of the circuit breaker relay is connected to the source of electrical supply.

It will be understood that various forms other than those described above may be used without departing from the spirit or scope of the invention.

What is claimed is:

1. An instrument board having an opening, a flanged bezel mounted in said opening, a raised panel having a plurality of openings, indicating instruments mounted on said panel with their faces opposite said plurality of openings, the raised portion of the panel bearing in the bezel and means for securing the panel to the board.

2. An instrument board having an opening, a flanged bezel mounted in said opening, a panel having a raised portion with a plurality of openings therein, a cover for the panel, a rim in each of the openings in the panel securing said cover to said panel, indicating instruments mounted on the back of said panel with their faces opposite openings in the panel, the raised portion of the panel resting in the bezel and means for securing the panel and bezel to the board.

3. An instrument board having an opening, a bezel mounted in said opening, a panel having a raised portion and a plurality of openings, a cover for said panel having openings registering with the openings in the panel, a rim mounted in each of the openings in the panel having its edges turned to secure the covering upon the panel and means for securing the raised portion of the panel in the bezel.

4. In combination with an instrument board having an opening, a flanged bezel mounted in said opening, a panel having a raised portion bearing in a groove in the bezel, the raised portion having a plurality of openings, rims mounted in said openings in the panel, supports secured upon the back of the raised portion by said rims, indicating instruments mounted in said supports and means for securing the panel and bezel to the board.

5. In combination with an instrument board having an opening, a flanged bezel fitting in said opening, a raised panel having a plurality of openings, the raised portion of the panel fitting snugly in the bezel, rims mounted in the openings in the panel, supports secured in position by said rims, said supports comprising flanged disks, indicating instruments mounted in said supports and means for securing the panel and bezel to the board.

6. In combination with an instrument board having an opening, a raised panel fitting in said opening and provided with an opening, a rim mounted in said opening in the panel, a support secured upon the panel by said rim, a flange upon said support, ribs upon the face of the support in the same plane with the edge of the rim, an indicating instrument mounted in said support and means for securing the panel to the board.

7. In combination with an instrument board, a panel having an opening therein, a rim mounted in the opening, a support secured in position by the rim, said support having a peripheral flange and rib members, the rib members being in the same plane with one edge of the rim, an instrument mounted in said support, the cover for the face of the instrument bearing upon the rib members, the wall of the instrument engaging the flange on the support and means for securing the instrument in said support.

8. In combination with an instrument board having an opening, a panel mounted on the board, said panel having a raised portion fitting in the opening, the raised portion having a plurality of openings, a cover for the panel, said cover having a plurality of openings registering with the openings in the panel, rims mounted in the openings in the panel and cover, supports secured by said rims, instruments on the supports and a plate for securing the instruments on said supports.

9. In a motor vehicle, in combination with an instrument board having an opening, a panel mounted on said instrument board, said panel having a raised portion engaging said opening, the raised portion having a plurality of openings, rims mounted in the openings in the panel, supports secured in position by said rims, indicating instruments mounted in said supports, a plate having lugs normal thereto, said plate adjustably secured to the panel, the lugs upon the plate engaging the instruments and a housing for the instruments.

10. In a motor vehicle, a combination with an instrument board having an opening, a panel secured upon said instrument board, said panel having a raised portion fitting in the opening, said raised portion having a plurality of openings, rims mounted in the openings in the panel, supports secured in position by said rims, indicating instruments mounted on said supports, said indicating instruments having openings in their walls, a housing for said instruments, lamps in said housing adjacent the openings in the walls of the instruments and means for controlling said lamps.

11. In a motor vehicle, in combination with an instrument board having an opening, a bezel fitting in said opening, a panel secured upon said board, said panel having a raised portion fitting in said bezel, the raised portion having a plurality of openings, a cover for said panel having openings registering with the openings in the raised portion of the panel, rims mounted in the openings in the raised portion of the panel and cover, supports secured in position by said rims, indicating instruments mounted in said supports, the walls of the indicating instruments having openings, transparent covers for the openings in the instruments, a housing for said instruments, lamps mounted in said housing adjacent the openings in the instruments, means for controlling said lamps and a shutter in the housing adjacent one of said lamps.

12. In a motor vehicle, in combination with an instrument board having an opening, a demountable panel in said opening, said panel having a plurality of openings, rims mounted in the openings in the panel, supports secured in position by said rims, indicating instruments mounted on said supports, a housing for said instruments, and means for removing one of said instruments without disturbing the housing.

13. In a motor vehicle, in combination with an instrument board having an opening, a demountable panel in said opening, said panel having a plurality of openings, a cover for said panel, the cover having openings registering with the openings in the panel, rims in the openings in the panel and cover, supports secured in position by the rims, indicating instruments mounted on the supports, said indicating instruments having openings to admit light to the faces thereof, means for independently demounting one of the instruments, a housing for the instruments, means for removing one of the instruments from the housing without disturbing said housing, lamps mounted in said housing adjacent the openings in said instruments and a shutter in the wall of said housing adjacent one of said lamps.

14. In a motor vehicle, in combination with an instrument board having an opening, a demountable panel in said opening, said panel having a plurality of openings, indicating instruments on the back of the panel opposite the openings in the panel, means for securing said instruments in position, a housing for the instruments, said housing notched to fit partly around one of the instruments, means for independently demounting and removing the instrument partly surrounded by the housing, the walls of the instruments slotted to admit light to the dials thereof, lamps in said housing for projecting light through the slots in the instruments, means for controlling the lamps and a shutter in the wall of the housing.

In testimony whereof I affix my signature.

ALFRED MOORHOUSE.